United States Patent [19]
Kampf

[11] 3,896,453
[45] July 22, 1975

[54] SPRING LOADING FOR THE STYLUS OF A PRESSURE-SENSITIVE CHART RECORDER

[75] Inventor: Richard S. Kampf, Costa Mesa, Calif.

[73] Assignee: Beckman Instruments, Inc., Fullerton, Calif.

[22] Filed: Oct. 9, 1973

[21] Appl. No.: 404,302

Related U.S. Application Data

[63] Continuation-in-part of Ser. No. 344,498, March 26, 1973, Pat. No. 3,852,769.

[52] U.S. Cl. .......................... 346/139 C; 346/139 B
[51] Int. Cl. ............................................ G01d 15/00
[58] Field of Search ........ 346/139 A, 139 C, 139 R, 346/139 B

[56] References Cited
UNITED STATES PATENTS

| | | | |
|---|---|---|---|
| 2,726,075 | 12/1955 | Hosford | 346/139 A X |
| 2,743,989 | 5/1956 | Clurman et al. | 346/139 A |
| 2,879,129 | 3/1959 | Alden | 346/139 A |
| 3,167,379 | 1/1965 | Grafstein | 346/139 A X |
| 3,787,878 | 7/1972 | Kampf et al. | 346/139 B X |

Primary Examiner—Joseph W. Hartary
Attorney, Agent, or Firm—R. J. Steinmeyer; N. E. Brunell

[57] ABSTRACT

Arch spring loading is provided for the stylus of a recorder utilizing pressure-sensitive chart paper carried through a fixed gap between a backing plate and a transparent front plate with means for moving the stylus transversely to the direction of motion of the chart paper in accordance with variations in magnitude of a quantity to be recorded. A steel band movable in accordance with variations in the quantity to be recorded is provided for carrying the stylus. The arch spring is in the form of a bowed piece of thin sheet metal secured to the stylus-carrying band. The stylus may consist of a dimple formed in the edge of the arch spring or in a triangular dimple plate, also secured to the stylus-carrying band and spring loaded by the arch spring.

10 Claims, 11 Drawing Figures

SPRING LOADING FOR THE STYLUS OF A PRESSURE-SENSITIVE CHART RECORDER

This application is a continuation in part of my application Ser. No. 344,498 now U.S. Pat. No. 3,852,769.

BACKGROUND OF THE INVENTION

Pressure-sensitive chart recorders are known in which pressure-sensitive chart paper or other material is employed which had the property of forming a dark line visible from the front of the chart when a stylus is pressed against the back of the chart and is moved along the back of the chart. Various means have been proposed for providing the requisite pressure of the stylus against the chart. An arrangement for a dual-channel chart recorder of the pressure-sensitive chart type is described in my copending application Ser. No. 344,498 filed Mar. 26, 1973 now U.S. Pat. No. 3,852,769, and assigned to the same assignee as the present application. In that arrangement there are two flexible tapes or metallic bands or strips which are movable in a fixed gap between a transparent front plate and a sheet metal backing plate forming a portion of the recorder frame.

The bands are mounted parallel to each other and movable in a direction transverse to the direction of motion of the chart in response to two different quantities, the variations in value of which are to be recorded upon the chart. Adjacent edges of the movable metal bands have dimples formed therein which serve as styli which are relatively close to each other so that there is a relatively small difference in time base between the curves drawn upon the chart by the transverse motion of the styli along chart back surface. In that arrangement, in order to press the styli against the back surface of the chart, pressure shoes are mounted behind the movable tapes and compression coil springs are provided to press the shoes against the back surface of the movable stylus-carrying band.

It is an object of the present invention to provide a further improvement in spring-loading means for the styli of pressure-sensitive chart recorders.

It is generally an object of the invention to provide a simplified, compact, inexpensive, easily manufactured construction for pressure-sensitive chart recorders and for spring-loading means therefor.

A further object of the invention is to avoid the necessity for pressure shoes and spring loading for such shoes and to provide spring-loading means which is sufficiently light and compact to be carried by the movable band itself, which is relatively inexpensive and easily manufactured and which enables the housing wall of the chart recorder case to be employed as a backing plate for the styli, which backing plate is fixed in position and avoids the use of pivoted or movable pressure shoes.

Other features, objects and advantages of the invention will become apparent as the description proceeds.

SUMMARY OF THE INVENTION

In carrying out the invention in accordance with a preferred form thereof, a recorder casing is constructed with a sheet metal frame having a front wall serving as a backing plate and a transparent front plate is mounted in front of the sheet metal recorder frame, parallel thereto and spaced therefrom to provide a fixed gap through which pressure-sensitive chart material may be drawn in one direction and stylus-carrying metal strips, or bands may be moved in a transverse direction, each in accordance with variations in a measurable quantity to be recorded for providing traces upon the chart by means of styli carried upon the bands and resting against the back surface of the pressure-sensitive chart.

For providing the requisite pressure against the back surface of the chart as its front surface is moved along the back surface of the transparent front plate, arch springs are provided. The arch springs are in the form of bowed pieces of sheet metal having two edges, one of which is spot welded to an edge of the movable tape. A dimple serving as a stylus is provided adjacent the second edge of the arch spring. The dimple may be formed in the material of the arch spring itself or in a separate triangular piece of sheet metal having an edge or the base of a triangle also spot welded to the same edge of the movable band as the arch spring spot welding and having the stylus dimple formed near the apex of the triangle. In another embodiment arch springs are provided on both sides of the stylus-carrying band. In still another embodiment the arch spring is simple, curved piece attached to the under side of a T-shaped piece with a stylus dimple formed therein at one end and secured to the stylus-carrying band at the other end.

A better understanding of the invention will be afforded by the following detailed description considered in conjunction with the accompanying drawings.

DRAWINGS

In the drawing,

FIG. 1 is a perspective view of a dualtrace pressure-sensitive chart recorder in a conventional case having a transport front window for exposing a portion of the chart and the traces formed thereon, FIG. 2 is a fragmentary view of a section of a portion of the recorder frame of the apparatus of FIG. 1 represented as cut by a horizontal plane, together with a schematic view of the movable chart front plate and one embodiment of arch spring stylus-loading means.

FIG. 3 is a fragmentary perspective view of the apparatus of FIG. 1 with the casing removed and a portion of the recorder frame, the movable chart and the stylus-carrying bands broken away to expose the interior operating mechanism, FIG. 4 is a exploded view of one of the stylus-carrying flexible bands and parts of the arch-type spring-loading mechanism employed in one embodiment of the invention, FIG. 5 is an exploded view corresponding to FIG. 4 of another embodiment of the invention requiring only one arch spring, FIG. 6 is a fragmentary sectional view of apparatus employing the embodiment of FIG. 5 where the recorder frame and transparent front plate are represented as cut by a horizontal plane, FIG. 7 is a view of a stylus-supporting assembly on a stylus-carrying band forming another embodiment of the invention, FIG. 8 is a partial exploded view of the embodiment of FIG. 7.

FIG. 9 is a perspective view of the stylus mounting and arch spring assembly for a wide stylus, FIG. 10 is a plan view of the arch spring means of the device of FIG. 9 and FIG. 11 is a perspective view of an assembly corresponding to FIG. 9 but for a narrow stylus.

Like reference characters are utilized throughout the drawing to designate like parts.

DETAILED DESCRIPTION

Figure 1:
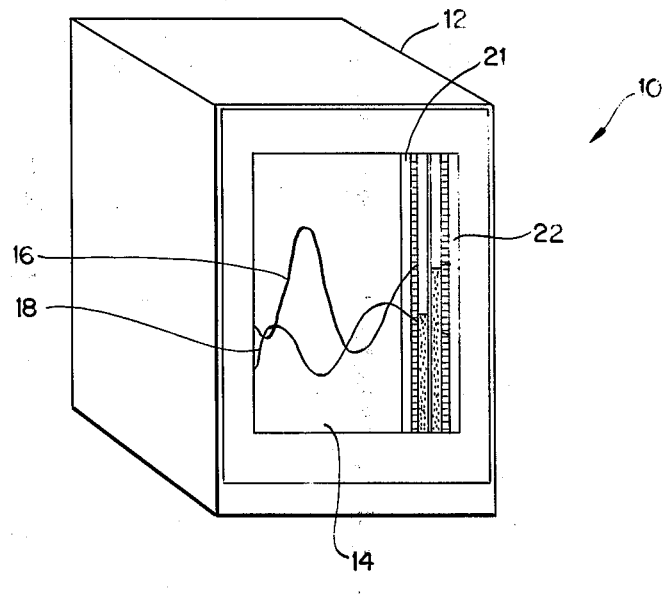

As illustrated in FIG. 1, a dual-trace, pressure-sensitive chart recorder 10 embodying the present invention may be mounted in a housing 12 having a window 14 through which recorded curves or traces 16 and 18 may be viewed. If desired, transparent scales 21 and 22 may be provided cooperating with instantaneous, measured value-indicating, differently colored strips 23 and 24 of the type described in my aforesaid copending application. Stylus-carrying tapes or bands of steel or the like 24 and 25 are also provided, each movable up or down in accordance with fluctuations in a measured value to be recorded continuously by means of the traces 16 and 18. The mechanism for moving the bands 23 and 24, however, does not constitute a part of the present invention. There is also a chart 27 composed of a continuous sheet of pressure-sensitive paper or other material with means (not shown) for moving it horizontally across the recorder in front of the stylus-carrying bands 25 and 26 and behind the indicator strips 23 and 24. In accordance with the invention, improved means are provided for mounting styli 28 and 29 upon the bands 25 and 26.

Figure 5:
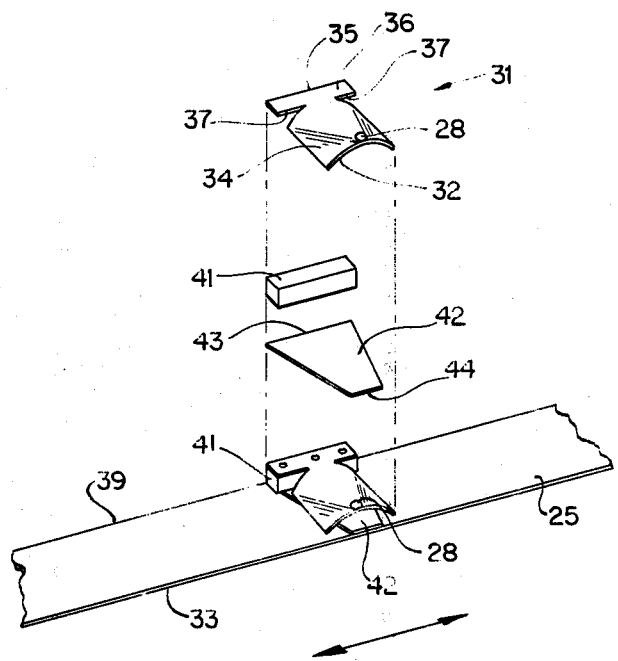

In the embodiment of FIG. 5 the stylus 28 is formed as a dimple or the like by means of a punch mark, for example, in a piece 31, of sheet spring material of suitable composition, such as spring steel alloy, for example. Preferably the stylus dimple 28 is formed near one edge 32 of the spring steel piece 31 and the spring 31 is mounted on the band 25 with its edge 32 along the right-hand edge 33 of the band 25. The stylus 29 carried by the band 26 is likewise located adjacent the left-hand edge of the band 26 so that the two styli 28 and 29 will produce the traces 16 and 18 with relatively little difference in time base.

Figure 6:
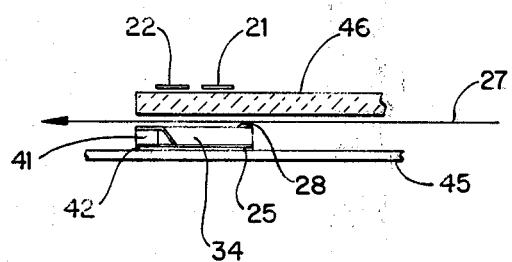
Figure 8:
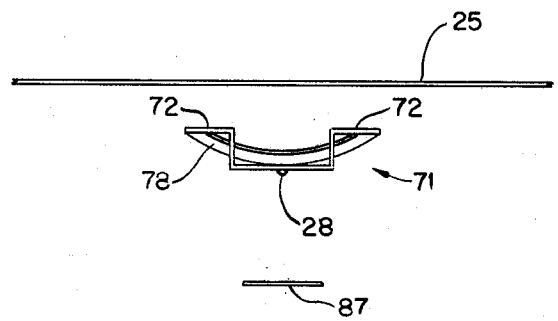

For spring loading the stylus 28 so that it presses forward against the rear edge of the pressure-sensitive chart material 27, the spring-steel piece 31 is bowed or formed with the arch portion 34 which has an arcuate cross section with its convex surface toward the chart 27 or upward as seen in FIGS. 5 and 6.

The spring piece 31 also has a second edge 35 with a flat portion 36 along the edge 35 and separated from the arched portion partially by notches 37. The spring piece 31 is secured to the band 25 with its edge 35 along the edge 39 of the band 25 in a suitable manner, such as by spot welding. Preferably, however, a spacing block 41 is interposed between the flat portion 36 of the arch spring 31 and the band 25. Moreover, a trapezoidal-shaped stiffener 42 is preferably provided with an edge 43 forming the base of the trapezoid at the edge 39 of the band 25 under the spacing block 41 and a narrower edge 44 along the edge 33 of the band 25. As shown, the length of the base 43 of the trapezoidal stiffener 42 conforms substantially to the length of the spacing block 41 and the edge 35 of the arch spring 31.

In order that the styli 28 and 29 may exert pressure against the rear surface of the chart 27 by reaction of the arch spring 31, the chart 27 and the stylus-carrying bands 25 and 26 with the styli 28 and 29 are arranged to move in a gap formed between two parallel planes. In the arrangement illustrated, this gap takes the form of the space between a flat surface which may be provided by the front of the recorder frame 45 to constitute a back plate and a front plate 46 which is preferably transparent, composed of glass, transparent plastic or the like, in order that the traces 16 and 18 may be viewed as soon as they are formed.

As the chart 27 is drawn through the gap between the transparent front plate 46 and the frame 45, the styli 28 and 29 press spots on the chart 27 against the transparent front plate 46 so as to produce darkened lines forming the traces 16 and 18. As the measured quantities change, the bands 25 and 26 move upward or downward carrying the styli 28 or 29 upward or downward so as to curve the traces 16 and 18.

Although the drag of the stylus on the chart paper as the paper moves across the recording area would tend to create an overturning movement about the band 25 or 26 which would tend either to add or subtract from the force being exerted by the arch spring, this tendency is avoided. The spacing and supporting block 41 tends to minimize this effect. The block 41 places the top of the arch spring 34 where the stylus 28 or 29 is located almost in line with the plane of the chart paper 27. Such a turning moment would also tend to warp the tape or band 25 or 26. However, such effect is substantially overcome by the presence of the stiffener plate 42.

In the embodiment illustrated in FIGS. 5 and 6, a single arch spring 34 is utilized for each of the styli 28 and 29 and the stylus-carrying bands 25 and 26 ride directly against the front surface of the frame plate 45 or any friction-minimizing coating thereon. However, the invention is not limited to the specific arrangement illustrated in FIGS. 5 and 6. The arrangement of FIGS. 5 and 6 provides a very simple construction in that the stylus dimple 28 or 29 may be formed in the arch spring 34 itself. However, the invention is not limited to this feature either and does not exclude the use of a separate dimple plate as illustrated in FIGS. 2 and 4, which also disclose an alternative embodiment of the double-arch spring type with arch springs on either side of he stylus-carrying band 25 or 26.

Figure 2:
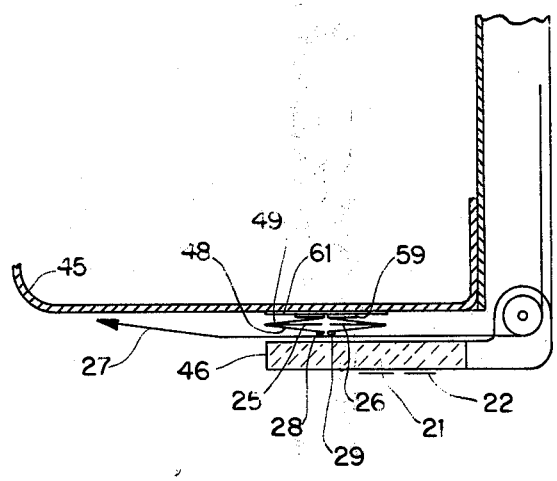
Figure 3:
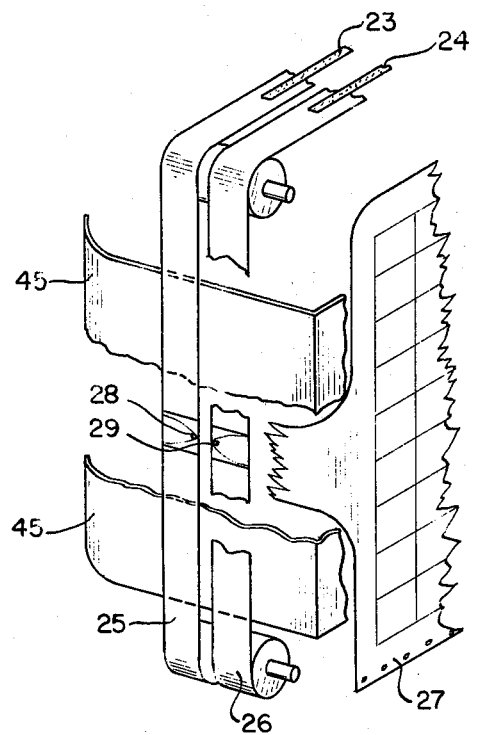
Figure 4:
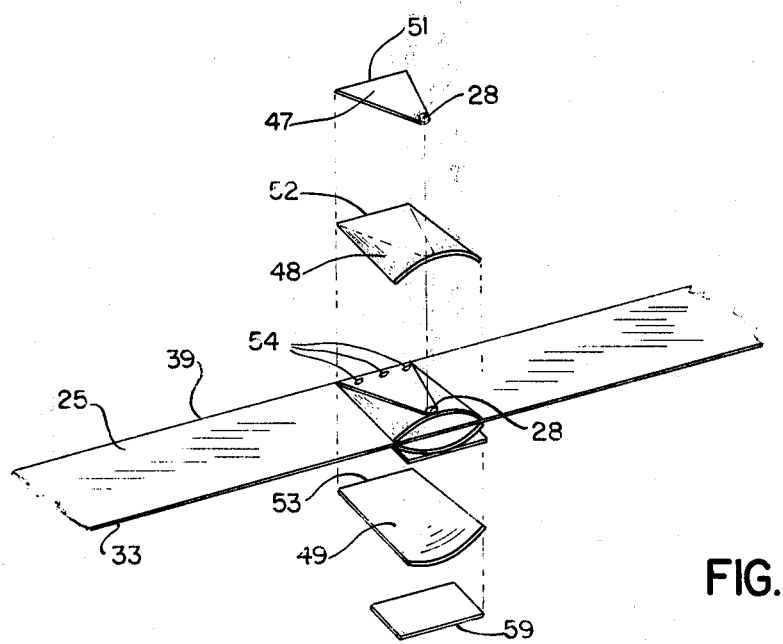

As illustrated in FIGS. 2 and 4, a dimple plate 37 is provided in which the stylus dimple 28 is formed, by punching, for example, and the dimple stylus 28 is spring-loaded by means of a pair of arch springs 48 and 49. The top arch spring 48 as viewed in FIG. 4 is at the front of the stylus-carrying band 25 and the lower arch spring 49 is at the rear surface of the band 25. The arch springs 48 and 49 are composed of spring sheet material similar to the arch spring 34 of the embodiment of FIGS. 5 and 6. As shown, the dimple plate 47 is triangular in shape with a base or edge 51 at the edge 39 of the band 25. The arch springs 48 and 49 also have edges 52 and 53, respectively, at the edge 39 of the band 25. The edges 39, 51, 52 and 53 are secured together by means of spot welds 54 passing through the sheet material along such edges. Preferably the lower arch spring 49 is provided with a shoe 55 adapted to ride along the front surface of recorder frame 45. Preferably a low friction surface is provided upon the frame 45 such as by means of strips or tapes of low friction polymer or plastic material 61 cemented to the front surface of the recorder frame 45. Such low friction strip material may be of any suitable composition such as polytetrafluoroethylene, for example.

Although the arrangement of FIGS. 2 and 4 embodies more parts than the embodiment of FIGS. 4 and 5, this arrangement also is relatively simple and inexpensive to manufacture in that the stylus spring-loading means is mounted directly on the flexible tape or stylus-carrying band and separate pressure shoes and loading springs need not be provided in the chart carriage. The short pieces of spring material constituting the arch springs 48 and 49 are spot welded to each side of the flexible bands and may be composed of substantially the same material as the flexible bands themselves. As shown, the arch springs are bowed or have arcuate edges along the edge 33 of the band 25 under the stylus 28 but are flat along the edges 52 and 53 so that they may be spot welded to the band 25. Thus, when the arch is compressed, it acts as a spring. The spacing of the recorder frame plate 45 and the transparent front plate 46 is such that the arch springs 48 and 49 are flattened out almost straight and thus produce the required pressure to force the styli against the back of the pressure-sensitive chart material to generate the trace 16 and 18 viewable from the front through the transparent plate 46.

FIG. 4 of the drawings illustrates an embodiment of the invention having an arch spring with a warped surface so that one edge may be flat in order that it may be spot welded to an edge of the stylus-carrying strip and the surface becomes rounded toward the other edge of the arch spring in order that spring pressure may be applied to the stylus carried at that edge. FIGS. 5 and 6 also illustrate an embodiment in which the arch spring has a flat portion and a curved portion, for attachment and spring action purposes, respectively. Moreover, FIGS. 5 and 6 illustrate an embodiment in which a block 41 is provided to bring one edge of the arch spring forward partially to the extent of forward projection of the stylus in order to cause the direction of action of frictional force between the moving chart and the stylus to be more nearly in alignment with the surface of the chart and thereby minimize tendency toward overturning of the stylus mount and the stylus-carrying band.

However, the invention is not limited to the details of the specific embodiments already described. Moreover, the invention is not limited to the specific manner of minimizing overturning tendency employed in the embodiment of FIGS. 5 and 6. A bridge type mounting assembly for the stylus and arch spring means may also be employed as illustrated, for example, in the embodiment of FIGS. 7–11 inclusive. In this embodiment a bridge member 71 is employed having feet 72 secured to the left-hand band 25 at its edge 39. A similar arrangement is employed for the right-hand stylus-carrying band 26, comprising a bridge member 73. Each bridge member is formed from a sheet of suitable sheet material such as spring steel or T-shaped configuration including a cross arm portion 74 and a leg portion 75 with the stylus 28 or 29 formed at the end of the leg portion so that it will be at the corresponding edge of the stylus-carrying band 25 or 26. The cross arm portions 74 are bent downward along lines 76 and outward along lines 77 to form right angles resulting in a bridge shape of the cross arm 74. The bridge configuration serves to space the outer edges of the bridge-form stylus mounting means 71 and 73 from the surfaces of the stylus-carrying bands 25 and 26 very nearly as far but not quite as far as the styli 28 and 29 for bringing the frictional forces between the styli and the moving chart very nearly in alignment with the chart surface and minimizing overturning tendency of the stylus mounting means and the stylus-carrying band so bandso that blocks such as the blocks 41 of FIG. 6 are not required.

Figure 9:
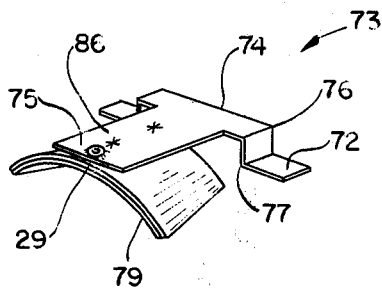
Figure 10:
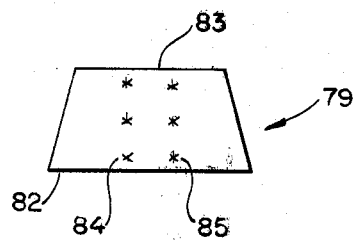
Figure 11:
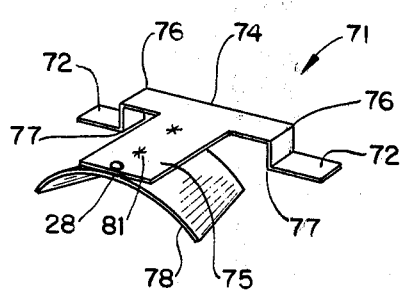

The embodiment of FIGS. 7–11 distinguishes from the previously described embodiments also in that arch spring means 78 and 79 are provided which are not directly attached to the stylus-carrying bands 25 and 26 but are indirectly secured thereto by attachment to the under surfaces of the leg portions 75 of the bridge mounting units 71 and 73. As illustrated in FIG. 11, the arch spring means 78 there comprises a single arch spring composed of a single sheet of spring material such as spring steel having arcuate edges with surfaces preferably lying along the surface of a right circular cylinder and not requiring a warped surface. The arch spring 78 is attached to the leg portion 75 of the stylus mount bridge member 71 by a line of tack welds 81. It will be observed that the width of the arch spring 78 measured between the arcuate edges is less than the width of the corresponding stylus-carrying band 25 or 26, with one edge aligned with the stylus-carrying end of the leg member 75 and the opposite edge spaced from the cross arm portion 74 of the bridge type stylus mount 71 or 73.

In order that the stylus pressure produced by the arch spring means 78 or 79 may be concentrated at the stylus 28 or 29, the edge of the arch spring means toward the cross arm portion 74 of the stylus mount 71 or 73 is made shorter than the opposite edge. This is illustrated in FIG. 10, constituting a developed view of the arch spring means 79 whereby the longer edge 82 is at the stylus edge of the stylus-carrying band and the opposite edge 83 is the shorter edge. It will be apparent that as the arcuately shaped arch spring means is compressed by the confinement of the assembly between the transparent front plate 46 and the back plate 45 or recorder frame, the edge 82 contacts the stylus-carrying band first; there is greater distortion and therefore greater bending force is exerted than at the shorter edge 83 by the confinement of the assembly between the front and back plates.

Preferably, as explained in pending application Ser. No. 344,498, on page 7 of the specification, the styli are of different widths so as to produce distinguishable traces 16 and 18 of different widths. For the sake of illustration the stylus 28 is a narrow stylus and the stylus 29 is the wide stylus. This difference in width is produced in the manner described in copending parent application Ser. No. 268,496. [Docket 19D-124]. The narrow stylus 28 is formed by punching a small bead or spherical bulge at the end of the leg portion 75 of the stylus mounting bridge 71 so as to project forward or toward the back surface of the chart 27 and the transparent front plate 46. The stylus may also be in the form of a cone with a rounded narrow apex. The wide stylus 29 may have the configuration illustrated by the stylus 294 shown in FIGS. 8 and 9, and described on page 13 of the copending application, Ser. No. 268,496 now U.S. Pat. No. 3,787,878, but punched in the leg portion 75 of the stylus mounting bridge 73 instead of in the stylus-carrying band. It constitutes a dimple with a concave center portion so as to form a ring of contact with the back surface of the chart 27, thus producing a broader trace than the stylus 28.

Owing to the fact that the stylus 29 produces a broader trace, it is desirable to apply greater pressure between the stylus 29 and the chart 27. This is accomplished by utilizing an arch spring means 79 which is of greater strength or stiffness for the stylus 29 than the arch spring 78 for the stylus 28. For example, as illustrated in FIGS. 9 and 10, the arch spring means 79 actually constitutes two pieces of sheet spring material. The two thickness of spring sheet material are attached to each other by two parallel lines of spot welds 84 and 85 shown in FIG. 10 to form the arch spring unit 79. The unit 79 in turn is attached to the under side of the leg portion 75 of the stylus mounting bridge 73 by a single line of tack welds or spot welds 76. The desired degree of stiffness may be attained by selection of the spacing between the lines of spot welds 74 and 75 in FIG. 10. The greater the spacing, the greater is the stiffness resulting.

Figure 7:
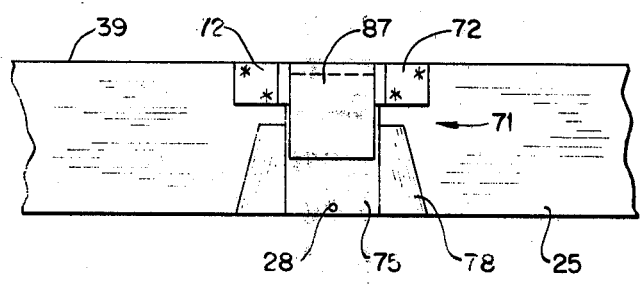

As a further means in limiting overturning tendency of the stylus mount and the stylus-carrying band, the bridge portion of the stylus mount may have a low friction coating. For example, as illustrated in FIG. 7, a sheet 87 of low friction material such as polytetrafluoroethylene may be applied to the bridge surface on the leg portion 75 of the unit 71 or 73. This may be accomplished by employing a strip of polytetrafluoroethylene material available on the market having the conventional self-adhering adhesive backing. Preferably the strip of material 87 is long enough so that the end toward the edge 30 of the stylus-adhering band 25 may be tucked under the cross arm portion 74 of the unit 71 or 73.

Specific arrangements and structural relationships have been illustrated and described by way of example, but it will be understood that the invention is not limited to the embodiments illustrated and various modifications will suggest themselves to those skilled in the art without departing from the spirit and scope of the invention.

What is claimed is:

1. An improved chart recorder of the type having a pressure-sensitive chart longitudinally movable between a backing plate and a transparent front plate and a stylus-carrying strip movable transversely to the direction of chart movement between said chart and one of said plates, wherein the improvement comprises:
    upper and lower arch springs secured to opposite sides of the stylus-carrying strip with the stylus means secured to one of said arch springs.

2. The improvement defined in claim 1 wherein the stylus means is secured to the upper arch spring and a shoe is secured to the lower arch spring opposite the location of the stylus means.

3. The improvement defined in claim 2 wherein a strip of low-friction polymer is secured to the portion of the backing plate behind the stylus-carrying strip to provide a low-friction path against which the shoe may ride.

4. An improved chart recorder of the type having a pressure-sensitive chart longitudinally movable between a backing plate and a transparent front plate, a stylus-carrying strip movable transversely to the direction of chart movement between said chart and one of said plates, and a spring with stylus means secured to the movable stylus carrying strip, wherein the improvement comprises:
    a stiffener sheet interposed between the spring and the stylus-carrying strip, one edge of the stiffener sheet and the spring are spot welded to one edge of the stylus-carrying strip and a second edge of the stiffener sheet is spot welded to the opposite edge of the stylus-carrying strip.

5. An improved chart recorder of the type having a pressure-sensitive chart longitudinally movable between a backing plate and a transparent front plate, a stylus-carrying strip movable transversely to the direction of chart movement between said chart and one of said plates, and a spring with stylus means secured to the movable stylus-carrying strip, wherein the improvement comprises:
    stylus mounting means formed at one end as a bridge attached to the stylus-carrying strip at one edge thereof and extending in the direction of the other edge of the stylus-carrying strip to position a stylus adjacent said other edge, wherein the spring is an arch spring of less width than the stylus-carrying strip and is attached to the under surface of the stylus mounting means, the arch spring having a convex surface forward and a concave surface toward the stylus-carrying strip.

6. The improvement defined in claim 5 wherein the arch spring is composed of a sheet of spring material in the shape of a trapezoid bent along an arc of a cylinder.

7. The improvement defined in claim 6 wherein the arch spring trapezoid has a shorter arcuate edge toward the bridge portion of the T and a longer arcuate edge substantially aligned with the edge of the stylus-carrying strip at which the stylus is located.

8. An improved chart recorder of the type having a pressure-sensitive chart longitudinally movable between a backing plate and a transparent front plate, a stylus-carrying strip movable transversely to the direction of chart movement between said chart and one of said plates, and a spring with stylus means secured to the movable stylus-carrying strip, wherein the improvement comprises:
    stylus mounting means formed at one end as a bridge attached to the stylus-carrying strip at one edge thereof and extending in the direction of the other edge of the stylus-carrying strip to position a stylus adjacent said other edge, wherein the spring comprises a pair of arcuate strips secured together as a unit and attached to the under side of the stylus mounting means to provide additional pressure for producing a broad trace.

9. The improvement defined in claim 8 wherein the arcuate strips are secured together by two parallel lines of welds extending transversely to the stylus-carrying strip.

10. The improvement defined in claim 9 wherein the lines of welds are spaced to stiffen the arch spring means.

* * * * *